United States Patent
Pothireddy et al.

(10) Patent No.: US 9,742,752 B1
(45) Date of Patent: Aug. 22, 2017

(54) DATA BACKUP AND SELF-SERVICE DATA RESTORATION

(71) Applicant: CA, Inc., Islandia, NY (US)

(72) Inventors: Vijaya Kumar Pothireddy, AndhraPradesh (IN); Aravind Kumar Banduchode, AndhraPradesh (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/310,060

(22) Filed: Jun. 20, 2014

(51) Int. Cl.
*H04L 29/06* (2006.01)
*G06F 11/14* (2006.01)

(52) U.S. Cl.
CPC .......... *H04L 63/08* (2013.01); *G06F 11/1412* (2013.01)

(58) Field of Classification Search
CPC .... H04L 63/08; G06F 11/1412; G06F 21/604; G06F 21/6209
See application file for complete search history.

(56) References Cited

U.S. PATENT DOCUMENTS

| | | | |
|---|---|---|---|
| 6,249,883 B1 * | 6/2001 | Cassidy et al. | 714/42 |
| 7,707,455 B2 * | 4/2010 | Anand | G06F 11/1469 711/161 |
| 8,560,709 B1 * | 10/2013 | Shokhor | H04L 63/20 709/203 |
| 8,739,300 B2 * | 5/2014 | Krajna et al. | 726/27 |
| 2006/0021029 A1 * | 1/2006 | Brickell | G06F 21/51 726/22 |
| 2011/0040730 A1 * | 2/2011 | Belea | 707/654 |
| 2013/0019100 A1 * | 1/2013 | Le Saint et al. | 713/172 |

\* cited by examiner

*Primary Examiner* — Carl Colin
*Assistant Examiner* — Vance Little
(74) *Attorney, Agent, or Firm* — Coats & Bennett, PLLC

(57) ABSTRACT

A user terminal stores security information for each of a plurality of files during a backup of the files. The user terminal also stores information regarding the configuration settings of one or more terminals from which a user may access the plurality of files. During a restore of the files to a remote user terminal, the user terminal at which the restore command was issued utilizes the saved security information to emulate the remote terminal as a virtual endpoint for the files. The user terminal determines whether the user is authorized to access the files within the virtual endpoint based on the saved security information, and restores the files to the remote terminal if the user is authorized for access to the files within the virtual endpoint.

19 Claims, 6 Drawing Sheets

DATA BACKUP AND SELF-SERVICE DATA RESTORATION

BACKGROUND

The present disclosure relates generally to systems for backing up and restoring data, and more particularly to computing devices for backing up data, and autonomously authenticating users to restore the backed up data.

Computers are generally very reliable. Sometime, however, they break down. And when they do, valuable data stored on those computers may be lost. Most users typically perform regular backups of their data utilizing a specialized backup utility to help protect against inadvertent data loss. This way, once a computer that has lost its data has been fixed, the backed up data can be restored to the computer utilizing a specialized restore utility.

Conventionally, data restoration is performed by mounting a medium onto which the data has been backed up, such as a tape drive, for example, to a computer. However, mounting such devices can only be performed on mutually compatible systems. In some cases, data can be backed up to the cloud; however, such systems require complicated security mechanisms to ensure that users can only access the data they are authorized to access. Further, restoration from such systems is not always timely.

Currently, once data has been lost, users wish to have faster access to their restored data. Additionally, many users balk at the prospect of having to open support tickets with their administrators to have that data restored. At the same time, network administrators want to maintain security of the data, and thus, wish to provide the users with access only to the backed up data they are authorized to access.

BRIEF SUMMARY

The present disclosure provides a method, a computing device, and a computer program product for backing up one or more data files from a user terminal to a storage medium, and for restoring those files to the device from the storage medium. Further, embodiments of the present disclosure autonomously authorize the user for access to the backed up files to facilitate the restoration of the files.

In one embodiment, the present disclosure provides a method for restoring previously backed up files. The method is performed by a user terminal, and recites sending a restore command to a network server. The restore command controls the network server to restore a file from a first storage device to a remote user terminal. The method then recites receiving an authentication request from the network server requesting that the user be authenticated for access to the file from the remote user terminal. To authorize the user as requested, the method creates a virtual endpoint comprising a temporary file. In this embodiment, the virtual endpoint comprises an emulation of the remote user terminal and is created from a configuration parameter of the remote user terminal. Additionally, the temporary file comprises a security context generated from a security parameter associated with the file to be restored. The method then calls for authenticating the user for access to the temporary file within the virtual endpoint based on the security parameter. If the user is granted access to the temporary file within the virtual endpoint, the file is restored to the remote user terminal.

In another embodiment, the present disclosure provides a user terminal comprising a communications interface circuit and a processing circuit. The communications interface circuit is configured to communicate data with a network server. The processing circuit is configured to send a restore command to the network server to control the network server to restore a file from a first storage device to a remote user terminal. In response to sending the restore command, the user terminal may receive an authentication request from the network server requesting that the user be authenticated for access to the file from the remote user terminal. The user terminal then creates a virtual endpoint comprising a temporary file. In this embodiment, the virtual endpoint comprises an emulation of the remote user terminal generated from a configuration parameter of the remote user terminal, while the temporary file comprises a security context generated from a security parameter associated with the file to be restored. The user terminal then authenticates the user for access to the temporary file within the virtual endpoint based on the security parameter, and restores the file to the remote user terminal if the user is granted access to the temporary file within the virtual endpoint.

In another embodiment, the present disclosure provides a computer program product comprising a computer-readable storage medium configured to store a control application that, when executed by a processor circuit on a user terminal, configures the processor circuit to send a restore command to the network server. The restore command controls the network server to restore a file from a first storage device to a remote user terminal. The control application also controls the processor circuit to receive an authentication request from the network server requesting that the user be authenticated for access to the file from the remote user terminal. The control application then controls the processor circuit to create a virtual endpoint comprising a temporary file. The virtual endpoint comprises an emulation of the remote user terminal generated from a configuration parameter of the remote user terminal, and the temporary file comprises a security context generated from a security parameter associated with the file to be restored. The control application then controls the processing circuit to authenticate the user for access to the temporary file within the virtual endpoint based on the security parameter, and restore the file to the remote user terminal if the user is granted access to the temporary file within the virtual endpoint.

In addition to the foregoing embodiments, the present disclosure also provides a method for backing up the data files. Particularly, in one embodiment, a method performed by a user terminal creates a security record for a file responsive to receiving a user command to backup the file to a first storage device. The security record is created to comprise a security parameter defining a security context for the file. The method also calls for determining a configuration parameter of the user terminal for emulating the user terminal as a virtual endpoint during a restoration of the file, and obtaining a security index for the security record. In one embodiment, the security index comprises a unique value that links the file to the security record. The security record, the configuration parameter, and the security index are then all stored in a second storage device, which is different from the first storage device. Once stored, the method calls for backing up the file to the first storage device.

In another embodiment, the present disclosure provides a user terminal configured to backup files to a first storage device. In this embodiment, the user terminal comprises a memory circuit that stores a plurality of data files to back up, and a processor circuit. The processor circuit is configured to create a security record for a file responsive to receiving a user command to backup the file to a first storage device, in which the security record comprises a security parameter defining a security context for the file. The processor circuit is also configured to store the security record in a security catalog file at a second storage device different from the first storage device, determine a configuration parameter of the user terminal for emulating the user terminal as a virtual endpoint during a restoration of the file, and store the configuration parameter at one of the first and second storage devices. The user terminal is further configured to obtain a security index (e.g., a unique value linking the file to the security record) for the security record, and obtain a security index for the security record. In this embodiment, the security index comprises a unique value linking the file to the security record. Once the data is extracted and stored, the user terminal backs the files up to the first storage device.

In yet another embodiment of the present disclosure, a computer program product comprising a computer-readable storage medium is provided. The computer-readable storage medium is configured to store a control application that, when executed by a processor circuit on a user terminal, configures the processor circuit to create a security record for a file responsive to receiving a user command to backup the file to a first storage device. The security record comprises a security parameter that defines a security context for the file. The control application also controls the processor circuit to store the security record in a security catalog file at a second storage device different from the first storage device, determine a configuration parameter of the user terminal for emulating the user terminal as a virtual endpoint during a restoration of the file, and store the configuration parameter at one of the first and second storage devices. The control application also controls the processor circuit to obtain a security index (e.g., a unique value linking the file to the security record) for the security record, and obtain a security index for the security record. In this embodiment, the security index comprises a unique value linking the file to the security record. Once the data is extracted and stored, the control application controls the processor circuit to backup the files to the first storage device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
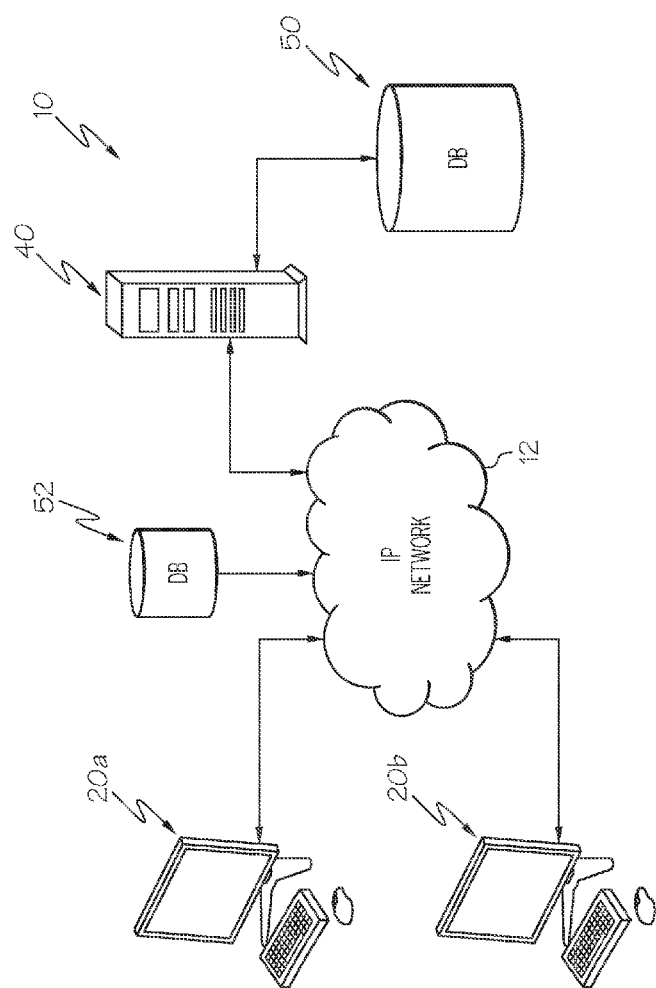
FIG. 1 is a block diagram illustrating a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computing device, a computer program product, and a corresponding computer-implemented method for backing up data files to a storage medium, and for restoring those backed up files from the storage medium to a computing device responsive to a user request. Additionally, a computing device configured according to embodiments of the present disclosure permits the user to restore only those files that the user is authorized to access. The computing device on which the files are restored may be the same computing device from which the files were backed up, or it may be different than the computing device from which the files were backed up. To accomplish this goal, embodiments of the present generate security information for each file that is backed up, and store that information in a security catalog separately from the data files being backed up. In response to receiving a user request to restore the data, the computing device utilizes this saved security information to authorize the requesting user and restore the data files.

Turning now to the drawings, FIG. 1 is a block diagram illustrating a system 10 configured according to one embodiment of the present disclosure. As seen in FIG. 1, system 10 comprises an IP network 12 that communicatively interconnects a plurality of user terminals 20a, 20b (collectively referred to as "user terminals 20") to a network server 40 and an associated database (DB) 50. Those of ordinary skill in the art will readily appreciate that the simplicity of the system 10 in FIG. 1 is for illustrative purposes only and that one or more additional servers, terminals, and other devices and entities may or may not be present in system 10.

The IP network 12 may comprise any private or public network known in the art (e.g., the Internet). Generally, the IP network 12 is configured to carry packets of data between the user terminals 20 and the server 40. Such packets are communicated utilizing the well-known Internet Protocol (IP), and may comprise user requests to backup data to, and restore data from, a database such as DB 50 or other data storage medium. Additionally, the data packets communicated over the IP network 12 carry the actual data being backed up and restored in compliance with the user requests.

The user terminals 20 may comprise any computing devices known in the art capable of communicating with the server 40 via IP network 12 to backup data to, and restore data from, DB 50. Although not explicitly shown, the communications links established between the user terminals 20 and the IP network may comprise cabling, such as Ethernet cabling, for example, or a well-known wireless area network (WAN) access connection, or in some embodiments, a Radio Access Network (RAN) connection. Some examples of suitable terminals 20 include, but are not limited to, desktop computing devices, laptop and notebook computing devices, tablet computing devices, mobile communication devices (e.g., smartphones), and the like.

As described later in more detail, the user terminals 20 store one or more files locally in a local memory circuit. From time-to-time, a backup utility is invoked on the user terminals 20 to backup those files to DB 50, which may comprise any computer-readable storage media known in the art including, but not limited to, a tape drive, a cloud-based storage medium, and a disk or disk array. In accordance with the present disclosure, the backup utility also controls the user terminals 20 to generate and/or obtain security information for each file, and to save that security information to a security catalog. The backup utility also controls the user terminals 20 to obtain their configuration settings, and store those settings in a configuration file along with the configuration settings of the other user terminals 20 connected to the network 12. Once this information has been generated or obtained, the security catalog and the configuration file may be stored in a computer-readable storage medium such as database 52 or a memory circuit associated with the network server 40, for example.

More particularly, the security catalog and the configuration file are files that are stored separately from, and independently of, the actual files being backed up to DB 50. In accordance with the present disclosure, the information in these files is used by the user terminals 20 when restoring the backed up data. Particularly, as described in more detail later, the user terminal 20 that issues a restore command uses the configuration settings associated with a terminal that is designated to receive the restored files to emulate the designated terminal on a remote computing device (e.g., another user terminal 20 or the network server 40). The user terminal 20 issuing the restore command can also utilize the security information stored in the security catalog to create temporary files within the context of the emulated device, and determine which files, if any, a given user is authorized to access from the designated terminal. The determination will indicate whether the given user is permitted to restore certain files to the designated terminal.

The network server 40 is also a computing device that handles the user requests from the user terminals 20. Particularly, during a file backup operation performed by user terminal 20, the server 40 receives data files stored at the user terminal 20 along with the file security information and the configuration settings of the user terminal 20. The data files being backed up are then sent to the server 40 for storage in DB 50, while security information and configuration information are stored at DB 52 or network server 40.

During a restore operation initiated by user terminal 20, the network server 40 retrieves the files to be restored from the DB 50, and sends the files to the user terminal 20 that has been designated to receive the restored files. However, as noted above, and as described in more detail below, the network server 40 will only restore the files to the designated user terminal if the user is authorized to access those files from the designated user terminal.

Figure 2:
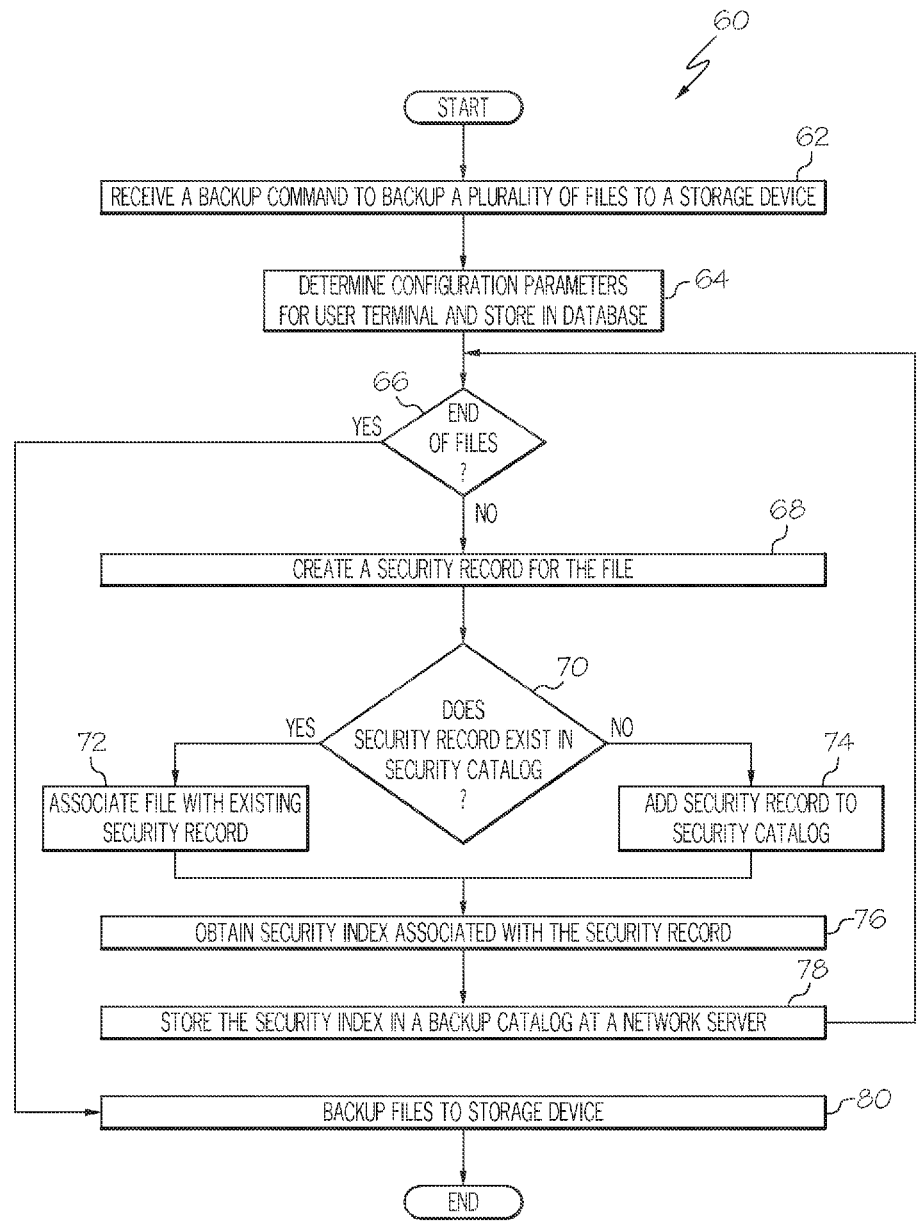
FIG. 2 is a flow diagram illustrating a method for performing a back-up of data according to one embodiment of the present disclosure.

FIG. 2 is a flow diagram illustrating a method 60 for backing up files stored locally at a user terminal 20. For ease of discussion, method 60 is described as if user terminal 20*a* were performing the backup; however, this is for illustrative purposes only. Those of ordinary skill in the art should appreciate that method 60 may be performed at network server 40, or at any user terminal or computing device that is configured to backup data files to a database such as DB 50.

Method 60 begins with the user terminal 20*a* receiving a user command to perform a backup of the files stored in its memory (box 62). For example, a user may launch a backup utility application at the user terminal 20*a* and manually issue a backup command. Alternatively, the backup utility application at the user terminal 20*a* may have been configured at one point to automatically issue a backup command at predetermined times. Regardless of how the backup command is issued, however, the user terminal 20*a* is configured to process each file to be backed up in accordance with the present disclosure.

Particularly, user terminal 20*a* will first determine one or more of its configuration parameters and store those configuration parameters in a database such as DB 52, for example (box 64). By way of example only, such configuration parameters comprise configuration settings and end point data that define the configuration of user terminal 20*a* to network 12. The configuration settings and end point data may include, but is not limited to, one or more of the identities (e.g., IP addresses) of the user terminal 20*a*, the identities of other user terminals or computing devices (e.g., user terminal 20*b* and network server 40) that a given user is permitted to access the file from, details regarding the domain of the user terminal 20*a*, the settings that allow user terminal 20*a* to share files across the network, settings for one or more applications executing at the user terminal 20*a*, and other information about the user terminal 20*a* that would allow a computing device connected to network 12 to recreate the user terminal 20*a* as a virtual endpoint during a file restore operation.

Such configuration parameters may be obtained, for example, from one or more configuration files and/or metadata associated with or stored at the user terminal 20*a*. Additionally or alternatively, the configuration parameters may be obtained from the underlying OS platform executing on the user terminal 20*a* via known Application Programming Interfaces (APIs) and the like. Regardless of how or from where the configuration parameters are obtained, however, recreating the user terminal 20*a* as a virtual endpoint at another computing device during a restore operation allows for the determination of whether the user is permitted to access the file in cases where such permissions cannot be otherwise determined.

Once the configuration parameters for user terminal 20*a* are stored, the method 60 begins processing the files for backup to DB 50. For illustrative purposes, the embodiment seen in FIG. 2 assumes that there is at least one file to be backed up. However, if no files exist, or if no existing files are to be backed up, method 60 would simply end.

If there are files to be backed up (box 66), the user terminal 20*a* will select a file and generate or obtain security information for the file. The user terminal 20*a* will then store that security information in a security record generated for the file (box 68). By way of example, the user terminal 20 may extract a security descriptor from the file. A security descriptor, as known in the art, is a data structure that stores security access information for a file. In some cases, security descriptors have access lists comprising access control entries that identify which users or groups of users can access the file. Further, security descriptors may comprise information and data that specifies the user permissions with respect to reading/writing the file, as well as the access levels for each user. Additionally, security descriptors might comprise information that identifies the owner of the file. Other data and information related to the user's ability to access a file to be restored may also be included in the security descriptor.

The information in the security descriptor and/or other security information is then used to determine whether a security record for the file already exists in a security catalog configured to store the security information (box 70). That is, two different files may have the same security-related information. Therefore, the user terminal 20*a* will first search a security catalog in which all security records are stored to determine whether the security information for the file to be backed up matches the security information of a file that was previously backed up. If a security record containing the security information already exists in the security catalog, the user terminal 20*a* will simply associate the name of the file with the existing security record (box 72). For example, the user terminal 20*a* may add the name of the file being backed up to the security record, or link the name of the file being backed up to the existing security record. Of course, other methods of associating the file being backed up with an existing security record are also possible. If a security record does not exist in the security catalog, however (box 70), the user terminal 20*a* will create a new security record for the file, populate the security record with some or all of the security information obtained from the file, and add the newly created security record to the security catalog (box 74).

Such checks allow embodiments of the present disclosure to maintain a single security record in the security catalog for multiple files. This provides benefits that conventional backup and restore utilities are not configured to provide. For example, the performance of the checks simplifies the validation of the user for a given file when restoring the file thereby saving the user time. Further, because the security record that comprises the security information is not unnecessarily duplicated, precious memory resources are judiciously managed and saved.

Additionally, as previously stated, the security catalog that comprises the security record need not be stored in the same storage medium to which the files are backed up (e.g., in DB 50). Rather, embodiments of the present disclosure store the security catalog in another computer-readable storage medium separately from the data files being backed up, such as in DB 52 or in memory at the server 40. Therefore, with the present disclosure, there is no need to utilize the actual backed up data files to determine user authorization. Rather, the information in the security record may be used independently of the backed up data files. Among other benefits, this allows for faster and more controlled access to the backed up data files while protecting the actual data from unauthorized access.

Once the security record is stored, the user terminal 20a generates a security index for the security record (box 76) and stores the security index in a backup catalog at the network server 40 or at DB 52 (box 78). In one embodiment, the security index comprises a unique value that is generated by the user terminal 20a using the information in the security record. For example, the unique value may be a hash value generated by user terminal 20a based on at least some of the contents of the security record. As described later in more detail, the security index is utilized during the restoration process of the file to facilitate the controlled access to the file by making the task of locating the proper security record in the security catalog easier and faster. Particularly, the user terminal 20a generates the security index and associates the security index with the name of the file being backed up. Then, the user terminal 20a associates the security index with an offset that identifies the location of the security record in the security catalog relative to the beginning of the security catalog. Given a filename, a user terminal perfomrring a restore of the file, such as user terminal 20b, for example, can retrieve the security index for the file, and utilize the associated security index to determine the offset for the security catalog. So determined, the user terminal performing the restore operation can identify the appropriate security record for the file, and retrieve the security information for the file being restored.

Once the security index is stored, the user terminal 20 determines whether there are any more files to process (box 66). If so, the process detailed above is repeated for each file to be backed up. When there are no more files to process, however, the user terminal 20a performs the backup of the user files from user terminal 20a to DB 50 (box 80). Method 60 ends once the backup procedure completes.

Figure 3:
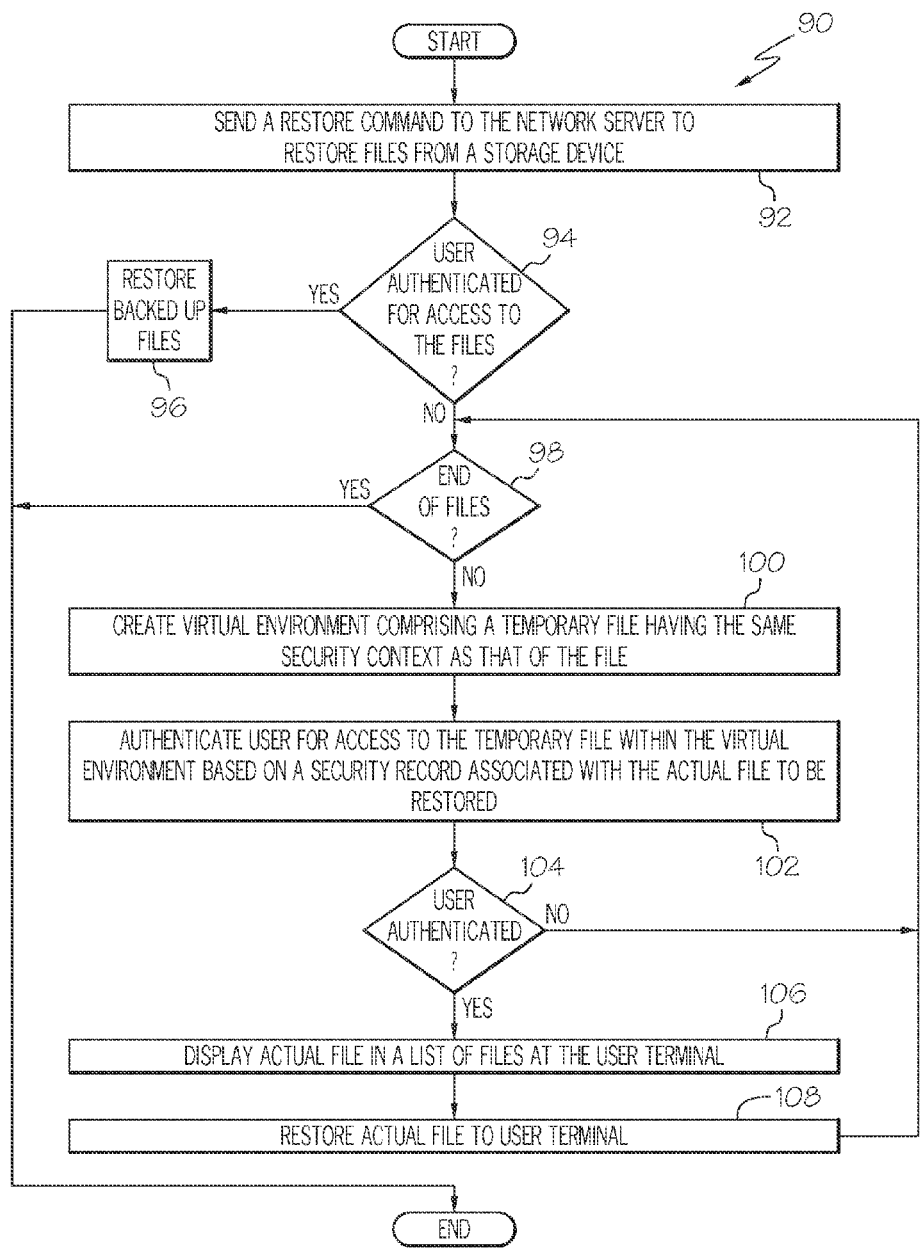
FIG. 3 is a flow diagram illustrating a method for restoring the backed-up data according to one embodiment of the present disclosure.

FIG. 3 is a flow diagram illustrating a method 90 for restoring one or more data files that were previously backed up to DB 50 according to one embodiment of the present disclosure. By way of example, method 90 may be performed in situations where a particular user terminal (e.g., user terminal 20a) is being replaced with another user terminal, and the files that were previously backed up from user terminal 20a will be placed on a replacement user terminal. Another situation in which method 90 may be performed is where a user restores files to user terminal 20a that were previously backed up from user terminal 20a, but using a different user terminal (e.g., user terminal 20b). For example, the user performing the restore operation may be unable to directly interact with user terminal 20a. In these situations, the user may control the restore operation from another, different user terminal.

To that end, method 90 is described in FIG. 3 as if a user at user terminal 20b was performing a restore operation to user terminal 20a. Those skilled in the art will readily appreciate, however, that this is for illustrative purposes only. Method 90 may be performed in other situations where the user's ability to access a previously backed up file from a specified user terminal cannot be readily confirmed. That is, the user terminal that is used for restoring the backed up files may be the same user terminal that was used to backup the files, or it may be a different user terminal communicatively connected to system 10.

Method 90 begins with the user terminal 20b initiating a restore procedure to restore a plurality of files previously backed up from user terminal 20a and stored in DB 50 to user terminal 20a. By way of example only, a user may invoke a restore utility at the user terminal 20b and issue a command to restore to user terminal 20a files that were previously backed up from user terminal 20a to DB 50 (box 92). Responsive to sending the restore command, the user terminal 20b will receive a request from the network server 40 requesting that the user terminal 20b determine whether the user is authorized to access the backed up files from user terminal 20a (box 94). Such requests may be prompted, for example, by the inability of network server 40 to determine whether the user can access the requested files from user terminal 20a. However, if the user is authorized to access the backed up files from user terminal 20a, the files are restored to the user terminal 20a (box 96) and the method 90 ends.

If the user cannot be authorized for access to the files from user terminal 20a to the backed up files, method 90 is configures the user terminal 20b to determine whether the user is authorized to access the backed up files from user terminal 20a. Particularly, for each file to be restored (box 98), method 90 creates the user terminal 20a as a virtual endpoint in memory (box 100). As stated above, configuration parameters defining the configuration settings of the user terminals 20 are stored in a storage medium such as DB 52 or at network server 40. Therefore, in one embodiment, user terminal 20b retrieves the configuration parameters for user terminal 20a, and utilizes those configuration parameters to emulate the user terminal 20a as a virtual endpoint.

Those of ordinary skill in the art should appreciate that in some embodiments, user terminal 20b creates the user terminal 20a as a virtual endpoint in local memory. In these cases, the user terminal 20b would comprise the necessary resources and computing power to create and maintain the virtual endpoint. In other cases, however, the user terminal 20b may not comprise the resources necessary to create the virtual endpoint. Such situations may occur, for example, when user terminal 20b is embodied as a tablet or mobile computing device, and/or comprises an operating system that is not fully compatible with the operating system of the designated user terminal 20a. In these cases, the user terminal 20b is configured to provide the configuration parameters and security record information to another user terminal, or to network server 40, and use well-known messaging to control that device to create the virtual endpoint and perform the authorization.

Regardless of where the virtual endpoint is created, however, the virtual endpoint is generated to include a temporary file having the same security context as that of the actual file being restored. Particularly, the information contained in the security record that was backed up with the file being restored identifies the user's access and permissions with respect to the file. The user terminal 20b uses this information to create the temporary file with the same user access and permissions as if the file were stored at the user terminal 20a.

Once the virtual endpoint is generated, method 90 will attempt to authorize the user for access to the temporary file using the information in the associated security record (box 102). If the user is authorized for access to the temporary file in the virtual endpoint (box 104), the method 90 can safely assume that the user is also authorized to access the actual backed up file from user terminal 20a. The name of the file to be restored can then be placed into a list for display to the user (box 106) and restored to the user terminal 20a (box 108). The method for restoring the files continues until there are no more files to restore (box 98), at which time method 90 ends.

Thus, embodiments of the present disclosure configure a "local" user terminal from which a user issues a restore command (e.g., user terminal 20b) to determine whether that user is authorized access to those files from a "remote" user terminal (e.g., user terminal 20a) to which the files are to be restored. To accomplish this, one embodiment of the present disclosure configures the computing device on which the virtual endpoint is created to interact with its underlying OS and platform to authorize the user on the remote user terminal.

Figure 4:
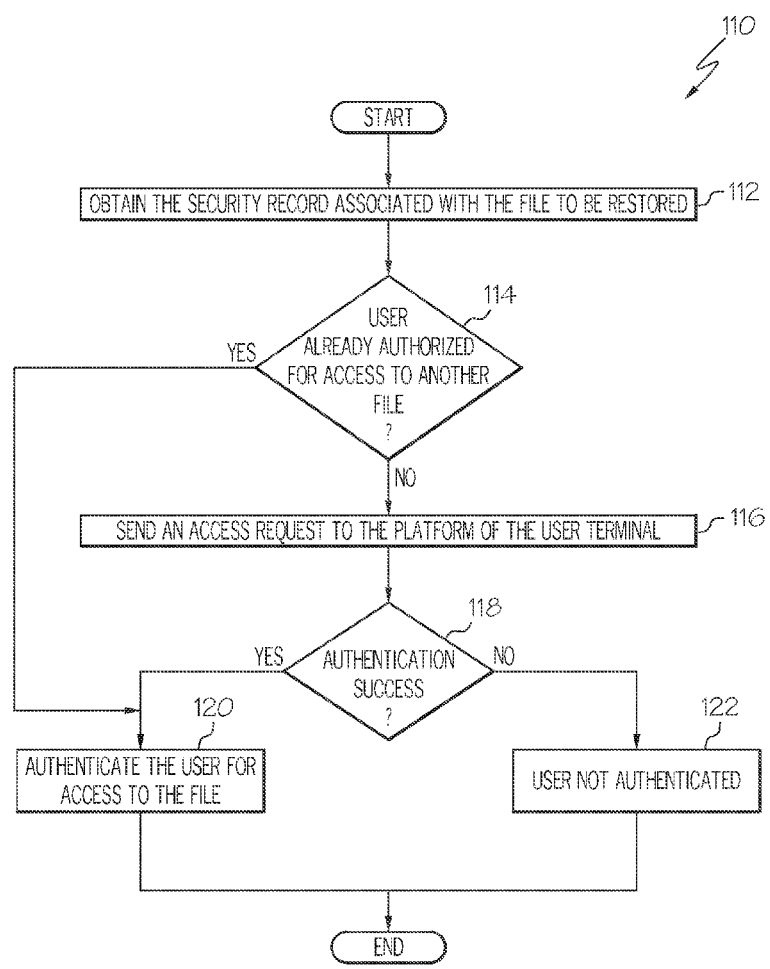
FIG. 4 is a flow diagram illustrating a method for authorizing a user to restore backed-up files according to one embodiment of the present disclosure.

Particularly, method 110, seen in FIG. 4, begins with the user terminal 20b obtaining the security record that is associated with the particular file that is to be restored to user terminal 20a from the security catalog stored in in DB 52 (box 112). As previously stated, the security record is stored in a security catalog file that may or may not be co-located on DB 50 along with the data files to be restored, and may be quickly located using the security index that was generated during the backup procedure for the file.

Upon retrieving the security record, the method 110 will first determine whether the security file is already associated with another file that was previously restored to user terminal 20, as well as whether the user has already been authorized to access the file from user terminal 20a (box 114). By way of example only, method 110 may check to determine whether the file name of the file being restored is associated with a security record that is linked to a file that the user is already authorized to access from user terminal 20a. If so, the user is also considered to be authenticated for access to the file being restored and method 110 ends. If not, method 110 uses the information in the security record (e.g., the filename and username/password combination for the user) to generate and send an access request to the platform of the user terminal 20b (or whichever computing device is emulating user terminal 20a using the virtual endpoint) to determine whether the user is entitled access to the file from user terminal 20a (box 116). Such functionality may be accessed, for example, by invoking an API function call to the underlying OS of the user terminal 20b. If the access request is granted by the OS (box 110), the user is authenticated for access to the file from user terminal 20a (box 120). Otherwise, the user is not authenticated for access to the file from user terminal 20a (box 122).

Thus, embodiments of the present disclosure utilize the security information stored in the security record to authenticate the user for access to the file with the underlying OS. This differs from conventional applications that require users to manually provide different username/password combinations specifically for the backup/restore utility. Additionally, because the present disclosure stores the security information in a security catalog separately from the actual data files, there is no need to access the actual data files to determine whether a given user is or is not authorized to access the backed up files. Therefore, the actual data files remains secure from unauthorized users.

As stated previously, embodiments of the present disclosure need not save a security record for each backed up file. Rather, the present disclosure creates a single record for a given file, and then links other files having the same security information to that security record. Not only does this save memory resources, but as seen above, it also saves time when authorizing a user during the restore operation.

Figure 5:
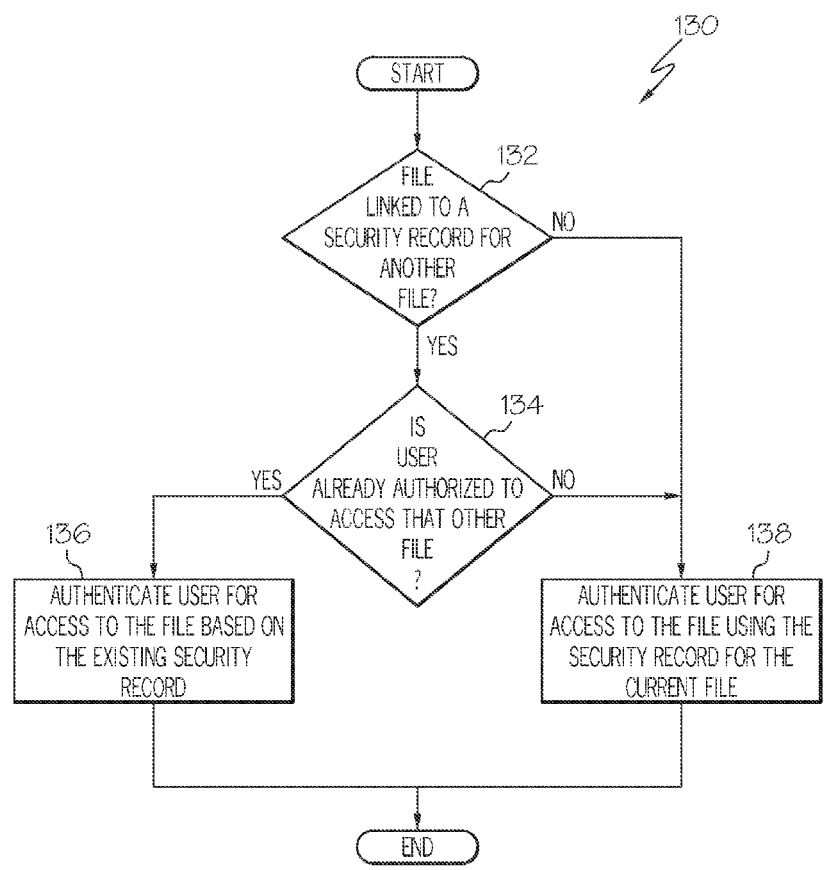
FIG. 5 is a flow chart illustrating an alternate method for authorizing a user to restore backed-up files according to one embodiment of the present disclosure.

More particularly, FIG. 5 is a flow diagram illustrating a method 130 for determining whether a user is or is not authorized for access to a given file. Method 130 begins by determining whether the file to be restored is linked to an existing security record for another file (box 132). If not, the method 130 authenticates the user for access to the file from the designated user terminal (e.g., user terminal 20a in this example) utilizing the information in the security record for the file, as previously described (box 138). Otherwise, the method 130 determines whether the user is already authorized for access to the file linked to the security record (box 134). If so, the method 130 can assume that the user is also authorized for access to the file being restored (box 136). If not, the method 120 authenticates the user for access to the file utilizing the information in the security record, as previously described (box 138).

Figure 6:
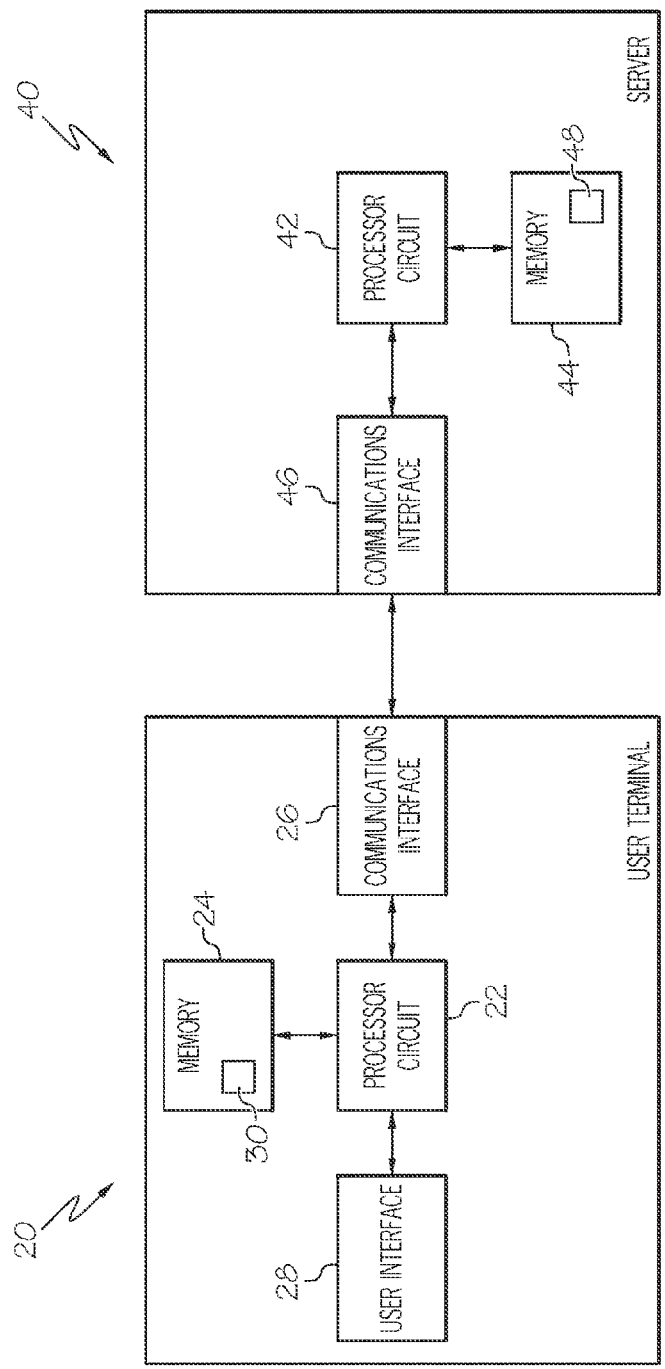
FIG. 6 is a block diagram illustrating some components of a user terminal and of a network server configured according to one embodiment of the present disclosure.

FIG. 6 is a block diagram illustrating some of the components that comprise a user terminal 20 and a network server 40 according to one embodiment. As seen in FIG. 6, user terminal 20 comprises a processor circuit 22, a memory circuit 24, a communications interface circuit 26, and a user input/output (I/O) interface 28. As readily understood by those of ordinary skill in the art, other components not explicitly shown in the figures may also be present.

The processor circuit 22 may be implemented by one or more microprocessors, hardware, firmware, or a combination thereof, and generally controls the operation and functions of user terminal 20 according to the appropriate standards. Such operations and functions include, but are not limited to, communicating with network server 40 to perform both backup and restore operations on data stored in memory circuit 24, as well as authorizing a user for access to one or more of the backed up files, as previously described. In this regard, the processor circuit 22 may be configured to the implement logic and instructions of a control application 30 (e.g., a backup and/or restore utility) stored in memory circuit 24 to perform these functions according to the embodiments as previously described.

The memory circuit 24 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 24 stores programs and instructions, such as control application 30, that control the processor circuit 22 of user terminal 20 to communicate with server 40 and to perform the backup, restore, and authorization functions previously described.

The communications interface circuit 26 facilitates communications with the network server 40 via IP network 12. To accomplish this function, the communications interface 26 may utilize any protocol or protocols known in the art to communicate messages and data in accordance with the previously described embodiments. In one embodiment, communications interface 26 comprises an ETHERNET card that communicates with server 40 utilizing the well-known Transmission Control Part (TCP)/IP protocols. However, in other embodiments, the communications interface 26 comprises a wireless transceiver capable of communicating with remote devices via a well-known cellular or wireless protocol.

The user I/O interface 28 provides the components necessary for a user to interact with the user terminal 20. Such components include, but are not limited to, a display, a keyboard, and a pointing device, such as a mouse, for example, that allows a user to interact with the control application 30 to issue the previously described backup and restore commands and to view a list of files to backup and/or restore.

The network server 40 also comprises a processor circuit 42, a memory circuit 44, and a communications interface circuit 46. The processor circuit 42 may be implemented by one or more microprocessors, hardware, firmware, or a combination thereof, and generally controls the operation and functions of server 40 according to the appropriate standards. Such operations and functions include, but are not limited to, communicating with the user terminals 20 to backup data to, and restore data from, DB 50. In this regard, the processor circuit 42 may be configured to the implement logic and instructions of a control application 48 stored in memory circuit 44 to perform these functions according to the embodiments as previously described.

The memory circuit 44 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 44 stores programs and instructions, such as control application 48, that control the processor circuit 42 to communicate with the user terminals 20 via the communications interface circuit 46 and network 12, and to perform the backup and restore functions previously described.

The communications interface circuit 46 facilitates communications with the user terminals 20 via IP network 12. To accomplish such communications, the communications interface circuit 46 may utilize any protocol or protocols known in the art to communicate messages and data in accordance with the previously described embodiments. As above, the communications interface circuit 46 may comprise an ETHERNET card that communicates with the user terminals 20 utilizing the well-known TCP/IP protocol, a transceiver operating according to any of a variety of well-understood wireless and/or cellular protocols, or the like.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method performed by a first user terminal, the method comprising:
   the first user terminal sending a restore command to a network server, wherein the restore command controls the network server to restore a file from a first storage device to a second user terminal;
   the first user terminal receiving an authentication request from the network server requesting that a user be authenticated for access to the file from the second user terminal;
   the first user terminal determining whether the user is authenticated for access to the file from the second user terminal based on a security descriptor in a security record for the file;
   if the security descriptor indicates that the user is authenticated for access to the file from the second user terminal, restoring the file from the first storage device to the second user terminal;
   if the security descriptor indicates that the user is not authenticated for access to the file from the second user terminal:
   the first user terminal creating a virtual endpoint comprising a temporary file, wherein the virtual endpoint comprises an emulation of the second user terminal generated from a configuration parameter of the second user terminal, and wherein the temporary file comprises a security context generated from a security parameter associated with the file to be restored;
   authenticating the user within the virtual endpoint for access to the temporary file based on the security parameter; and
   the first user terminal restoring the file to the second user terminal if the user is granted access within the virtual endpoint to the temporary file.

2. The method of claim 1 further comprising retrieving the security record from a second storage device that is different from the first storage device, wherein the security record is linked to the file and comprises the security parameter of the file to be restored.

3. The method of claim 2 wherein retrieving the security record from a second storage device that is different from the first storage device comprises:
   retrieving a security index associated with a filename of the file to be restored from the second storage device;
   determining an offset value associated with the security index, wherein the offset value identifies an offset from a beginning of a security catalog file; and
   retrieving the security record from the security catalog file beginning from the offset value.

4. The method of claim 2 further comprising retrieving the configuration parameter from a configuration file stored at one of the first and second storage devices, wherein the configuration file comprises configuration parameters for each of a plurality of user terminals communicatively connected to the network server.

5. The method of claim 2 wherein the file to be restored comprises a first file in a plurality of files to be restored, and wherein the restore command further controls the network server to restore a second file in the plurality of files from the first storage device to the second user terminal.

6. The method of claim 5 further comprising:
   determining that the second file is linked to the security record of the first file; and
   restoring the second file to the second user terminal if the second file is linked to the security record of the first file, and if the user is authorized for access to the first file from the remote terminal.

7. The method of claim 1 wherein if the first user terminal is not capable of emulating the remote terminal, creating a virtual endpoint comprising a temporary file comprises:
   the first user terminal selecting a computing device that is capable of emulating the second user terminal;
   the first user terminal creating the virtual endpoint and the temporary file at the selected computing device; and
   the first user terminal controlling the selected computing device to authenticate the user for access to the temporary file within the virtual endpoint based on the security parameter.

8. The method of claim 7 wherein controlling the selected computing device to authenticate the user for access to the temporary file within the virtual endpoint based on the security parameter comprises:
   the first user terminal obtaining a security record linked to the file to be restored, wherein the security record comprises a security descriptor for the file;
   the first user terminal providing the security descriptor to a platform of the selected computing device;
   the first user terminal receiving a message from the selected computing device indicating whether the user is authenticated within the virtual endpoint for access to the temporary file; and
   the first user terminal authenticating the user for access to the temporary file if the message from the selected computing device indicates that the user is authenticated within the virtual endpoint for access to the temporary file.

9. The method of claim 1 wherein determining whether the user is authenticated for access to the file from the second user terminal based on a security descriptor in a security record for the file comprises:
   obtaining the security record linked to the file to be restored, wherein the security record comprises the security descriptor for the file;
   providing the security descriptor to an operating system of the first user terminal; and
   authenticating the user for access to the temporary file if the operating system authenticates the user for access to the temporary file based on the security descriptor.

10. A first user terminal comprising:
   a communications interface circuit configured to communicate data with a network server; and
   a processor circuit configured to:
   send a restore command to the network server, wherein the restore command controls the network server to restore a file from a first storage device to a second user terminal;
   receive an authentication request from the network server requesting that a user be authenticated for access to the file from the second user terminal;
   determine whether the user is authenticated for access to the file from the second user terminal based on a security descriptor in a security record for the file;
   if the security descriptor indicates that the user is authenticated for access to the file from the second user terminal, restore the file from the first storage device to the second user terminal; and
   if the security descriptor indicates that the user is not authenticated for access to the file from the second user terminal:
   create a virtual endpoint comprising a temporary file, wherein the virtual endpoint comprises an emulation of the second user terminal generated from a configuration parameter of the second user terminal, and wherein the temporary file comprises a security context generated from a security parameter associated with the file to be restored;
   authenticate the user within the virtual endpoint for access to the temporary file based on the security parameter; and
   restore the file to the second user terminal if the user is granted access within the virtual endpoint to the temporary file.

11. The first user terminal of claim 10 wherein the processor circuit is further configured to retrieve the security record from a second storage device that is different from the first storage device, and wherein the security record is linked to the file and comprises the security parameter of the file to be restored.

12. The first user terminal of claim 11 wherein to retrieve the security record from the second storage device, the processor circuit is further configured to:
   retrieve a security index associated with a filename of the file to be restored from the second storage device;
   determine an offset value associated with the security index, wherein the offset value identifies an offset from a beginning of a security catalog file; and
   retrieve the security record from the security catalog file beginning from the offset value.

13. The first user terminal of claim 11 wherein the processor circuit is further configured to retrieve the configuration parameter from a configuration file stored at one of the first and second storage devices, and wherein the configuration file comprises corresponding configuration parameters for each of a plurality of user terminals communicatively connected to the network server.

14. The first user terminal of claim 11 wherein the file to be restored comprises a first file in a plurality of files to be restored, and wherein the restore command further controls the network server to restore a second file in the plurality of files from the first storage device to the second user terminal.

15. The first user terminal of claim 14 wherein the processor circuit is further configured to:
  determine that the second file is linked to the security record of the first file; and restore the second file to the second user terminal if the second file is linked to the security record of the first file, and if the user is authorized for access to the first file from the remote terminal.

16. The first user terminal of claim 10 wherein if the first user terminal is not capable of emulating the remote terminal, the processing circuit is further configured to:
  select a computing device that is capable of emulating the second user terminal;
  create the virtual endpoint and the temporary file at the selected computing device; and
  control the selected computing device to authenticate the user for access to the temporary file within the virtual endpoint based on the security parameter.

17. The first user terminal of claim 16 wherein to control the selected computing device to authenticate the user for access to the temporary file within the virtual endpoint based on the security parameter, the processing circuit is further configured to:
  obtain a security record linked to the file to be restored, wherein the security record comprises a security descriptor for the file;
  provide the security descriptor to a platform of the selected computing device;
  receive a message from the selected computing device indicating whether the user is authenticated within the virtual endpoint for access to the temporary file; and
  authenticate the user for access to the temporary file from the second user terminal if the message from the selected computing device indicates that the user is authenticated for access within the virtual endpoint to the temporary file.

18. The first user terminal of claim 10 wherein to determine whether the user is authenticated for access to the file from the second user terminal based on a security descriptor in a security record for the file, the processor circuit is further configured to:
  obtain the security record linked to the file to be restored, wherein the security record comprises the security descriptor for the file;
  provide the security descriptor to an operating system of the first user terminal; and
  authenticate the user for access to the temporary file if the operating system authenticates the user for access to the temporary file based on the security descriptor.

19. A computer program product comprising a physical computer-readable storage medium storing a control application that, when executed by a processor circuit on a first user terminal, configures the first user terminal to:
  send a restore command to the network server, wherein the restore command controls the network server to restore a file from a first storage device to a second user terminal;
  receive an authentication request from the network server requesting that a user be authenticated for access to the file from the second user terminal;
  determine whether the user is authenticated for access to the file from the second user terminal based on a security descriptor in a security record for the file;
  if the security descriptor indicates that the user is authenticated for access to the file from the second user terminal, restore the file from the first storage device to the second user terminal;
  if the security descriptor indicates that the user is not authenticated for access to the file from the second user terminal:
  create a virtual endpoint comprising a temporary file, wherein the virtual endpoint comprises an emulation of the second user terminal generated from a configuration parameter of the second user terminal, and wherein the temporary file comprises a security context generated from a security parameter associated with the file to be restored;
  authenticate the user within the virtual endpoint for access to the temporary file based on the security parameter; and
  restore the file to the second user terminal if the user is granted access within the virtual endpoint to the temporary file.

* * * * *